United States Patent
Kida

(10) Patent No.: US 7,476,279 B2
(45) Date of Patent: Jan. 13, 2009

(54) CLEANING TOOL FOR A CONNECTING END FACE OF AN OPTICAL CONNECTING PART AND METHOD

(75) Inventor: Takahisa Kida, Tokyo (JP)

(73) Assignee: Seikoh Giken Co., Ltd. (JP)

( * ) Notice: Subject to any disclaimer, the term of this patent is extended or adjusted under 35 U.S.C. 154(b) by 652 days.

(21) Appl. No.: 11/002,487

(22) Filed: Dec. 3, 2004

(65) Prior Publication Data

US 2005/0133062 A1 Jun. 23, 2005

(30) Foreign Application Priority Data

Dec. 9, 2003 (JP) ............................ P2003-410928

(51) Int. Cl.
*B08B 7/00* (2006.01)
(52) U.S. Cl. .................. 134/6; 134/9; 134/16; 134/32; 134/40; 134/42
(58) Field of Classification Search ...................... 134/6, 134/9, 16, 32, 40, 42
See application file for complete search history.

(56) References Cited

U.S. PATENT DOCUMENTS

| | | | | |
|---|---|---|---|---|
| 3,905,863 | A * | 9/1975 | Ayers | 162/113 |
| 5,117,528 | A * | 6/1992 | Kanayama et al. | 15/210.1 |
| 5,768,738 | A * | 6/1998 | Lee | 15/210.1 |
| 6,209,163 | B1 | 4/2001 | Clairadin et al. | |
| 6,466,723 | B2 * | 10/2002 | Miyake et al. | 385/134 |
| 6,681,437 | B1 * | 1/2004 | Miyake et al. | 15/210.1 |
| 6,739,161 | B2 * | 5/2004 | Ohara et al. | 66/194 |
| 2002/0108636 | A1 * | 8/2002 | Childers et al. | 134/6 |
| 2004/0103491 | A1 * | 6/2004 | Fujiwara et al. | 15/97.1 |

FOREIGN PATENT DOCUMENTS

| | | |
|---|---|---|
| EP | 0 662 537 | 7/1995 |
| EP | 0 727 174 | 8/1996 |
| EP | 1 103 215 | 5/2001 |

(Continued)

OTHER PUBLICATIONS

Computer Translation of JP2003-200116.*

(Continued)

*Primary Examiner*—Sharidan Carrillo
(74) *Attorney, Agent, or Firm*—Blank Rome LLP

(57) ABSTRACT

A connecting end face cleaning tool having superior cleaning properties includes a cleaning fabric. This cleaning tool removes soiling attached to the connecting end face of an optical connecting part when that connecting end face is detached. The cleaning fabric is constructed such that the woof threads protrude from the surface of the fabric more than the warp threads. The cleaning fabric has a tape-like shape, the lengthwise direction of which is the direction of the extension of the warp threads. Soiling is removed from a connecting end face as the connecting end face and cleaning fabric are moved relatively such that the connecting end face moves transverse to the woof threads of the cleaning fabric. A method of cleaning a connecting end face uses a cleaning fabric with woof threads protruding from the surface of the fabric more than the warp threads and the fabric is moved relative to the connecting end face transverse to the woof threads of the fabric.

3 Claims, 11 Drawing Sheets

FOREIGN PATENT DOCUMENTS

| | | |
|---|---|---|
| GB | 2 349 070 | 10/2000 |
| JP | 60-183907 | 12/1985 |
| JP | 02-171706 | 7/1990 |
| JP | 03-130436 | 6/1991 |
| JP | 05216121 A * | 8/1993 |
| JP | 408045039 A * | 2/1996 |
| JP | 11276396 | 10/1999 |
| JP | 11276397 | 10/1999 |
| JP | 11276398 | 10/1999 |
| JP | 11276399 | 10/1999 |
| JP | 2002-018690 | 1/2002 |
| JP | 2002-219433 | 8/2002 |
| JP | 2003 200116 | 7/2003 |
| JP | 2004-127435 | 4/2004 |

OTHER PUBLICATIONS

European Search Report mailed Feb. 21, 2008.

* cited by examiner

FIG. 1
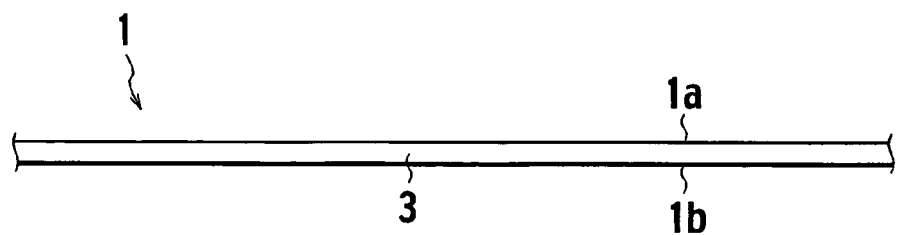
FIG. 2A  FIG. 2B
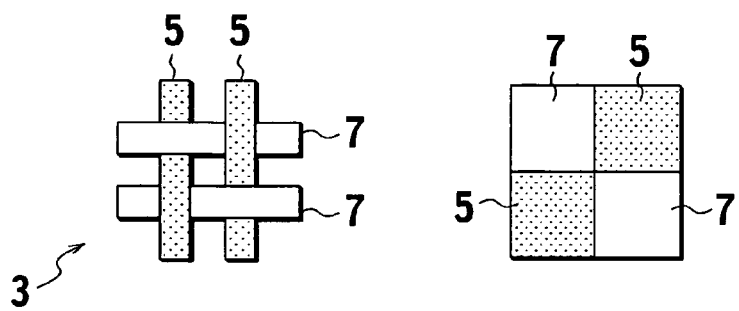 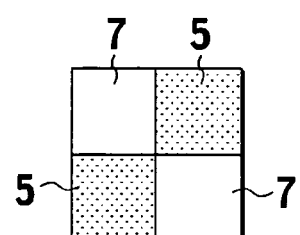
FIG. 3A  FIG. 3B
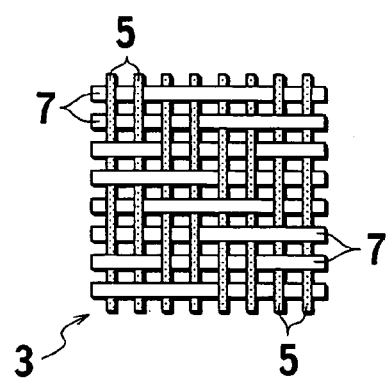 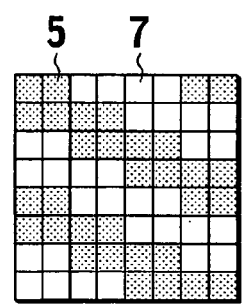
FIG. 4A  FIG. 4B
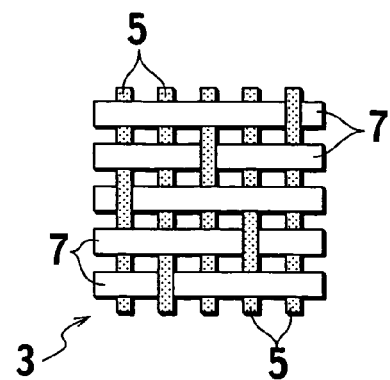 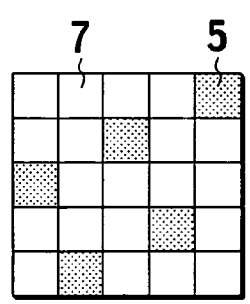

WOOF THREAD      WARP THREAD

PLAIN WEAVE

CLEANING TOOL FOR A CONNECTING END FACE OF AN OPTICAL CONNECTING PART AND METHOD

CROSS-REFERENCE TO RELATED APPLICATIONS

This application is based upon and claims the benefit of priority from Japanese Patent Application No. 2003-410928 filed on Dec. 9, 2003, the entire content of which is incorporated by reference herein.

BACKGROUND OF THE INVENTION

1. Field of the Invention

The present invention relates to a cleaning tool for the connecting end face of an optical connecting part, used for removing any soiling or attached matter present on the connecting end face of a frequently connected and disconnected optical connector or the like. The invention also relates to a method of cleaning the connecting end face of an optical connecting part.

2. Description of Related Art

Optical connectors incorporated in equipment used for optical transmission are frequently connected and disconnected. For this reason, dust or oils and the like may become attached to the end face of an optical connector when the connector is disconnected, causing a deterioration in the transmission properties of the connector. In order to prevent this problem, the connecting end face of an optical connector is cleaned when the optical connector is disconnected.

Cleaning tools for cleaning the connecting end face of an optical connector include cleaning tools for a male type connector having an exposed connecting end face of a ferrule and cleaning tools for a female type connector in which the connecting face to be cleaned is enclosed in an adapter as in an optical connector incorporated in a switchboard or the like. A variety of different types of cleaning tools have been proposed for these two types of optical connectors.

For example, there are cleaning tools for cleaning a male type connecting end face that operate by pressing the connecting face of a ferrule against the surface of a cleaning tape and moving the connecting end face relative to the cleaning tape to perform cleaning. The cleaning tool disclosed in Japanese Unexamined Patent Application Publication No. 2003-200116 operates by bringing the connecting end face of a ferrule into contact with the surface of a running cleaning tape for cleaning.

Further, cleaning tools for cleaning the end face of a female type connector include tools such as the cleaning tool disclosed in Japanese Patent No. 3,350,850. In that cleaning tool, a cleaning part comprises a housing having an engaging part that engages an optical connector. The cleaning tool is inserted in the optical connector and the connecting end face is cleaned by running a cleaning tape exposed from the end part of the cleaning part. Also disclosed is a cleaning tool in which cleaning tape is brought into contact with the connecting end face and then rotated to clean the connecting end face.

Cleaning tools that are used to clean a connecting end face by moving cleaning tape in relation to the connecting end face generally employ non-woven fabric or plain woven (flat woven) fabric having no directionality.

SUMMARY OF THE INVENTION

As a result of investigating the effects on the cleaning properties of fabric having no directionality and other fabrics used in the conventional cleaning tape of cleaning tools for cleaning the connecting end face of an optical connecting part as described above, the inventor of the present invention discovered that there are differences in cleaning properties according to the different types of fabric used.

An object of the present invention is to determine the relationship between cleaning properties and the type of cleaning fabric used in a cleaning tool for cleaning the end face of an optical connecting part so as to provide an end face-cleaning tool for an optical connecting part having superior cleaning properties.

In order to achieve the above objective, according to one aspect of the present invention, a cleaning tool for the end face of an optical connecting part is provided comprising a cleaning fabric made of woven fabric having a surface and woof and warp threads, the woof threads protruding out more from the surface of the fabric than the warp threads, said cleaning fabric having a tape-like form, the lengthwise direction of which is the direction of the extension of said warp threads.

BRIEF DESCRIPTION OF THE ACCOMPANYING DRAWINGS

These and other objects, features and advantages will become clearer from the following description of exemplary embodiments of the invention, read in connection with the accompanying drawings in which:

FIG. 1 is a schematic plan view of a connecting end face cleaning tool formed in a tape-like shape according to the present invention;

FIG. 2A and FIG. 2B are respectively, a structural view and a schematic view of plain woven fabric;

FIG. 3A and FIG. 3B are respectively, a structural view and a schematic view of twill woven fabric;

FIG. 4A and FIG. 4B are respectively, a structural view and a schematic view of satin woven fabric;

DETAILED DESCRIPTION OF THE INVENTION

Figure 5:
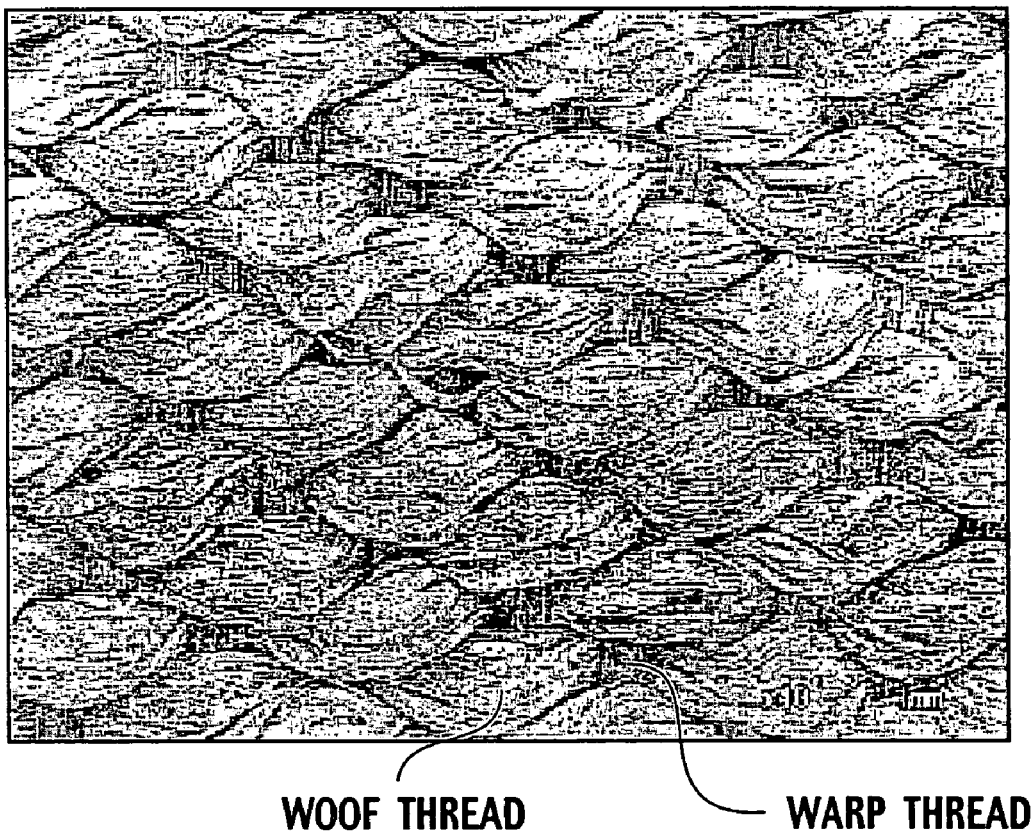
FIG. 5 is an actual photograph of satin woven fabric in which the woof threads protrude from the fabric surface more than the warp threads.

Exemplary embodiments of the invention are described below with reference to the accompanying drawings. The described exemplary embodiments are intended to assist the understanding of the invention, and are not intended to limit the scope of the invention in any way. In the drawings, like reference numerals identify like elements.

An embodiment of the present invention will now be described with reference to FIGS. 1 to 15.

FIG. 1 is a schematic plan view of a cleaning fabric for a connecting end face-cleaning tool formed in a tape-like shape according to the present invention.

In FIG. 1, a connecting end face-cleaning tool 1 comprises a cleaning fabric 3 made of woven fabric having a surface in which the woof threads protrude out further in relation to the warp threads. More specifically, thread comprised of a plurality of thick fibers is used for the warp of the woven fabric and thread comprised of a plurality of fibers that are thin in comparison to the fibers of the warp is used for the woof. It is preferable that the diameter of each of the fibers of the warp threads is 15 μm or greater and that the diameter of each of the fibers of the woof threads is 2 μm or less.

This fabric 3 may be plain woven, twill woven or satin woven.

FIG. 2A shows a structure of plain woven fabric. In this plain woven fabric, each of the woof threads 7 passes alternately over and under each of the warp threads 5 and each of the warp threads 5 passes alternately over and under each of the woof threads 7.

FIG. 2B shows a schematic view of the plain woven fabric shown in FIG. 2A. As shown in FIG. 2B, in the plain woven fabric, the woof threads 7 are exposed on the surface of the fabric at the same ratio as the warp threads 5. Accordingly, if thread of the same diameter and comprised of fibers of the same diameter as that of the warp threads 5 is used for the woof threads 7, the ratio of protrusion on the surface of the fabric of the woof threads 7 is the same as that of the warp threads 5. However, if threads of the same diameter as that of the warp threads 5 and comprised of finer fibers is used for the woof threads 7, the woof threads protrude further on the surface of the fabric than the warp threads because the bulk density of the threads decreases as the diameter of the fibers becomes smaller.

FIG. 3A shows an exemplary structure of twill woven fabric. In the twill woven fabric shown in FIG. 3A, each of the woof threads 7 passes alternately over and under each grouping of four of the warp threads 5 and each of the warp threads 5 passes alternately over and under each grouping of two of the woof threads 7.

FIG. 3B shows a schematic view of the twill woven fabric shown in FIG. 3A. As shown in FIG. 3B, in the same manner as the plain woven fabric, in this twill woven fabric the woof threads 7 are exposed on the surface of the fabric at the same ratio as the warp thread 5. Accordingly, if thread of the same diameter and comprised of fibers of the same diameter as that of the warp threads 5 is used for the woof threads 7, the ratio of protrusion on the surface of the fabric of the woof threads 7 is the same as that of the warp threads 5. However, if thread of the same diameter as that of the warp threads 5 and comprised of finer fibers is used for the woof threads 7, in the same manner as the plain woven fabric, the woof threads protrude further on the surface of the fabric than the warp threads because the bulk density of the thread decreases as the diameter of the fibers becomes smaller.

FIG. 4A shows an exemplary structure of satin woven fabric. In this satin woven fabric shown in FIG. 4A, each of the woof threads 7 passes alternately over a grouping of four warp threads 5 then under one warp thread 5 and each of the warp threads 5 passes alternately under a grouping of four of the woof threads 7 and over one of the woof threads 7.

FIG. 4B shows a schematic view of the satin woven fabric shown in FIG. 4A. As shown in FIG. 4B, in this satin woven fabric the woof threads 7 are exposed on the surface in a greater proportion than the warp threads 5. Accordingly, even when thread of the same diameter and comprised of fibers of the same diameter as that of the warp thread 5 is used for the woof thread 7, the ratio of protrusion on the surface of the fabric of the woof threads 7 is greater than that of the warp threads 5.

FIG. 5 shows a typical example of satin woven fabric. This satin woven fabric is woven using warp threads comprised of fibers of 15 μm diameter and woof threads of the same diameter as the warp threads and comprised of fine fibers of 2 μm diameter. Because the fabric is woven using the woof threads comprised of finer fibers than that of the warp threads, the fibers of the woof threads protrude out over the entire surface of the fabric greater than the warp threads.

Cleaning fabric 3 structured as described above is cut out in a tape-like shape such that the direction of the extension of the warp threads 5 is in the lengthwise direction of the fabric. Here, cut edges 1a and 1b each providing a clean edge with no fluffiness can be obtained by a cutting process that cuts the fibers using heat, such as ultrasonic cutting or thermal cutting.

Formed in this way, the tape-shaped cleaning fabric 3 for the connecting end face cleaning tool 1 is used, when cleaning a male type connecting end face 9a (FIG. 14) of an optical connecting part 9, by running the cleaning fabric 3 along the surface of a supporting base 10 and pressing the connecting end face 9a vertically downwardly onto the surface of the cleaning fabric 3. In this way, the connecting end face 9a is rubbed by the woof threads 7 of the cleaning fabric 3 thereby removing soiling on the connecting end face 9a.

As the woof threads 7 protrude more on the surface of the cleaning fabric 3 than the warp threads 5 in the connecting end face cleaning tool 1, a connecting end face 9a being cleaned is rubbed with substantial frictional force, thereby facilitating efficient removal of soiling on the end face being cleaned. Further, as the woof thread 7 is comprised of fine fibers even very small particles of soiling on the connecting end face can be easily removed.

In summary, this embodiment of the connecting end face cleaning tool 1 according to the present invention has the following characteristics.

Firstly, the cleaning fabric is woven of warp threads comprised of a plurality of thick fibers and woof threads comprised of a plurality of fine fibers, the woof threads protruding on the surface of the cleaning fabric to a greater extent than the warp threads.

Secondly, the cleaning fabric can be plain woven, twill woven or satin woven fabric.

Thirdly, threads comprised of extremely fine fibers having a diameter of 2 μm or less are used for the woof threads.

Fourthly, as the cleaning fabric is subject to either ultrasonic cutting or thermal cutting such that the direction in which the warp threads extend is the lengthwise direction of the fabric, the cleaning fabric is a tape-like form having a clean edge with no fluffiness.

According to the above-described connecting end face cleaning tool 1, soiling and attached substances can be effectively removed from a connecting end face being cleaned. A clean connecting end face can thereby be obtained as the connecting end face being cleaned is moved relative to the fabric so in a direction transverse to the woof threads of the fabric in which the woof threads protrude on the surface to a greater extent than the warp threads.

EXAMPLE 1

Figure 14:
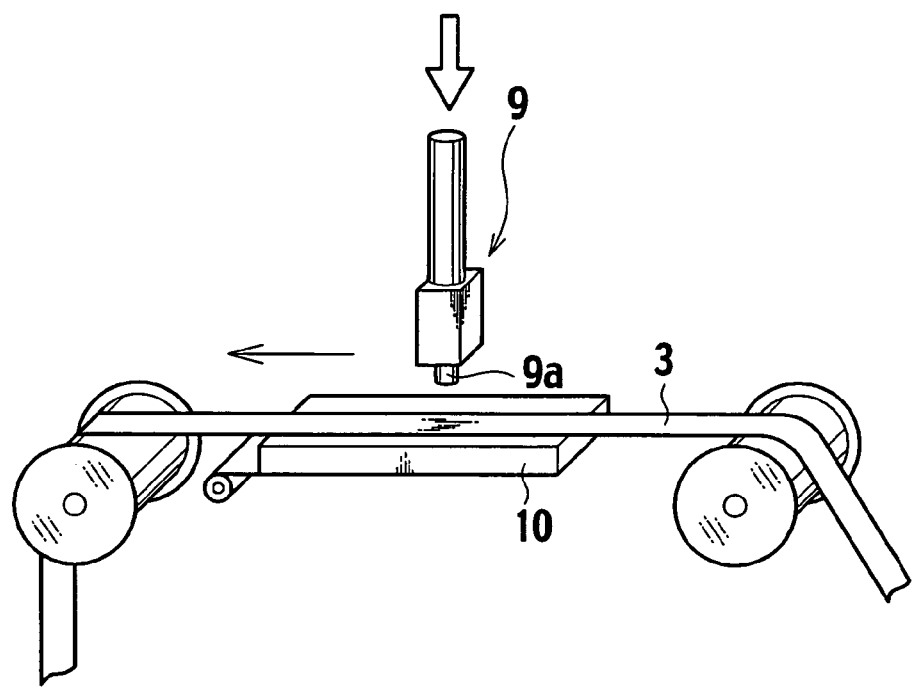
FIG. 14 is a schematic view showing the cleaning of a male type connecting end face using a cleaning fabric.

An assessment of the cleaning properties of the above-described cleaning tape 3 was conducted in relation to a connecting end face 9a of a male type connector 9 as shown in FIG. 14. More specifically, to assess the cleaning properties of the cleaning tape 3, reflection loss was measured 30 times before soiling was applied to the connecting end face 9a, after soiling was applied to the connecting end face 9a and after cleaning the connecting end face 9a with the cleaning tape 3. Soiling was applied according to Bellcore (previously Bell Labs) standard GR-2923-CORE 5.1.4 to the connecting end face 9a. Cleaning of the connecting end face 9a was conducted by relative displacement of 50 mm of the connecting end face in the lengthwise direction of the cleaning tape 3, that is to say, in the direction transverse to the woof of the tape, while the connecting end face 9a was pressed to the cleaning tape 3.

Figure 6:
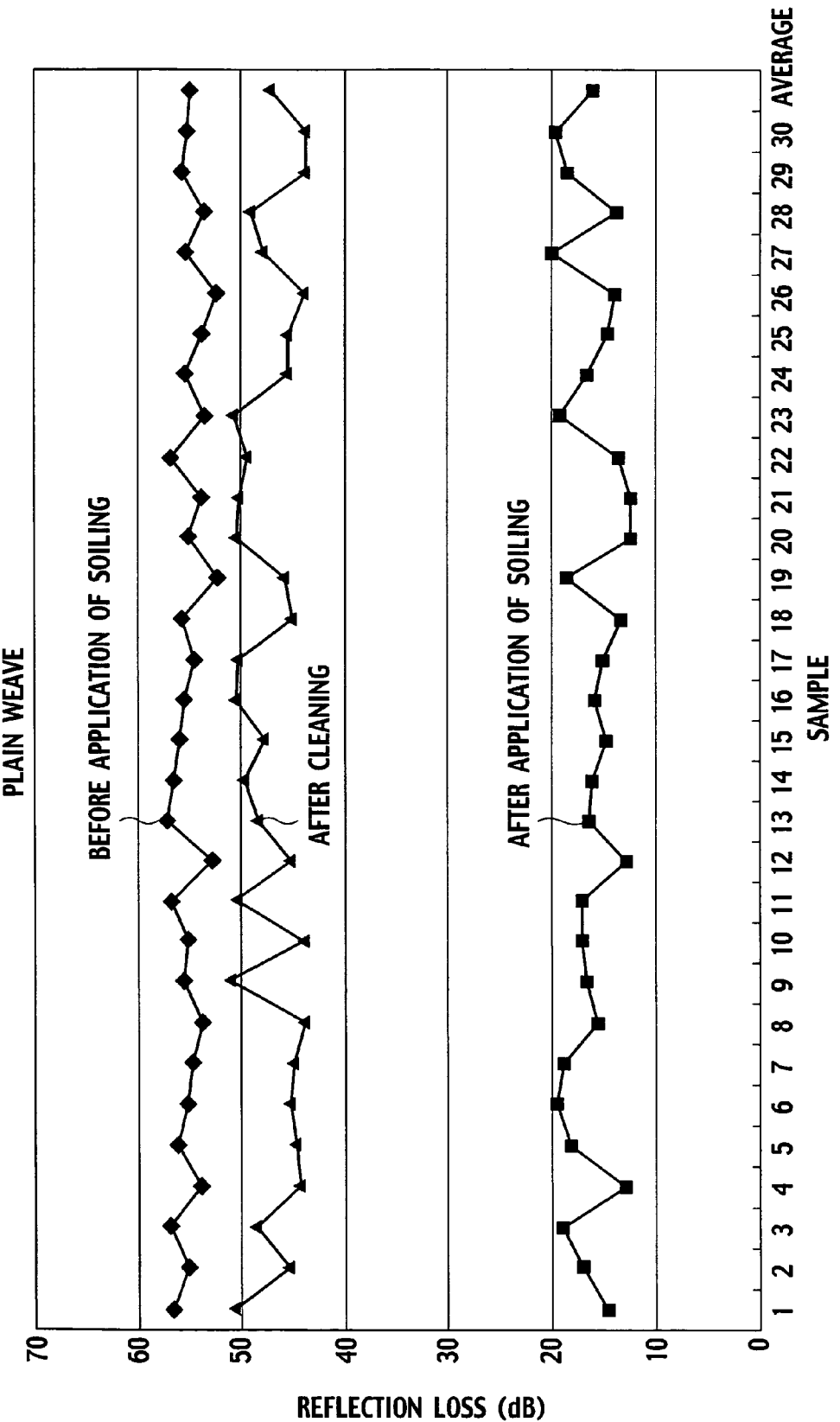
FIG. 6 shows the results of a cleaning experiment performed on a male type connecting end face using plain woven fabric cleaning tape.
Figure 7:
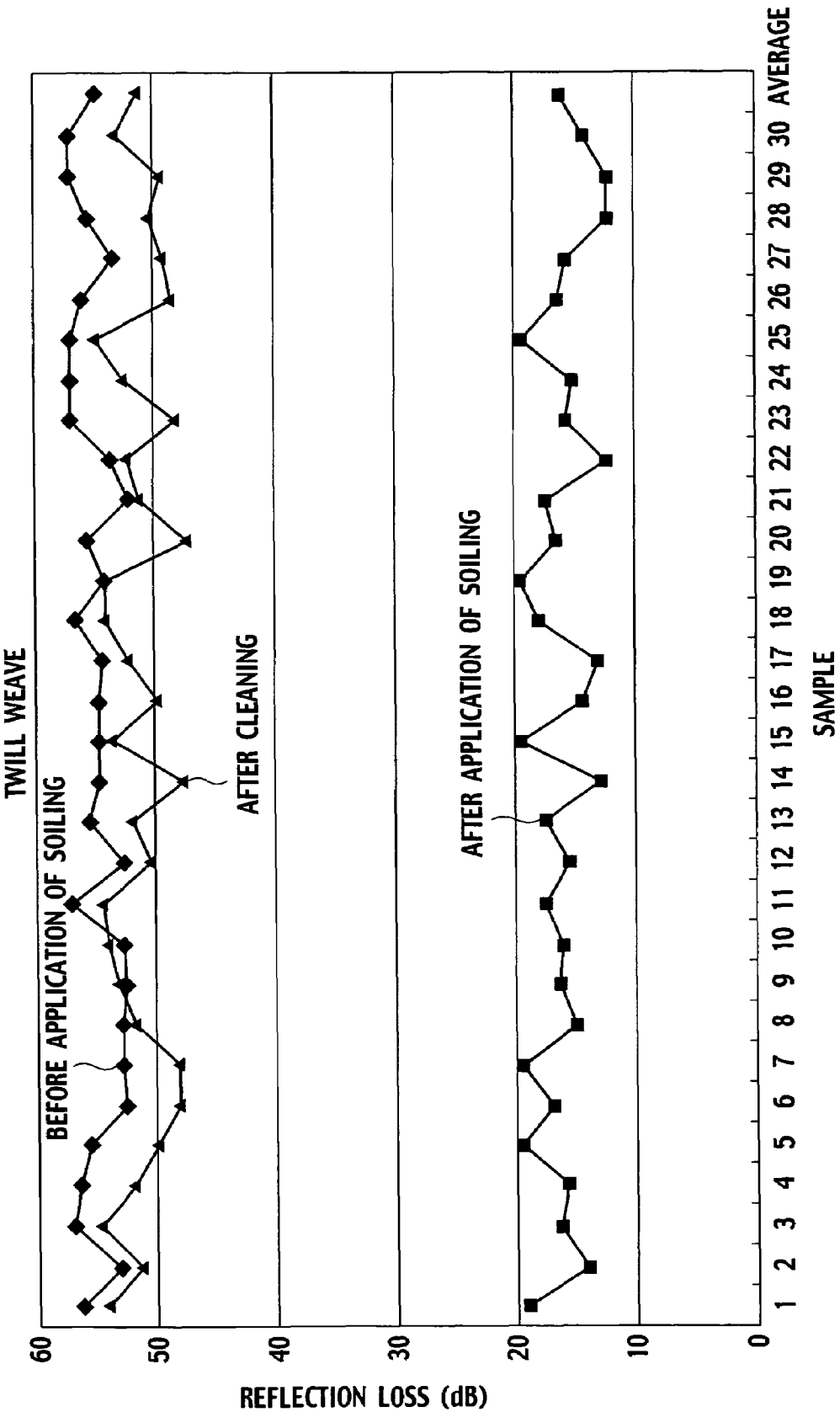
FIG. 7 shows the results of a cleaning experiment performed on a male type connecting end face using twill woven fabric cleaning tape.
Figure 8:
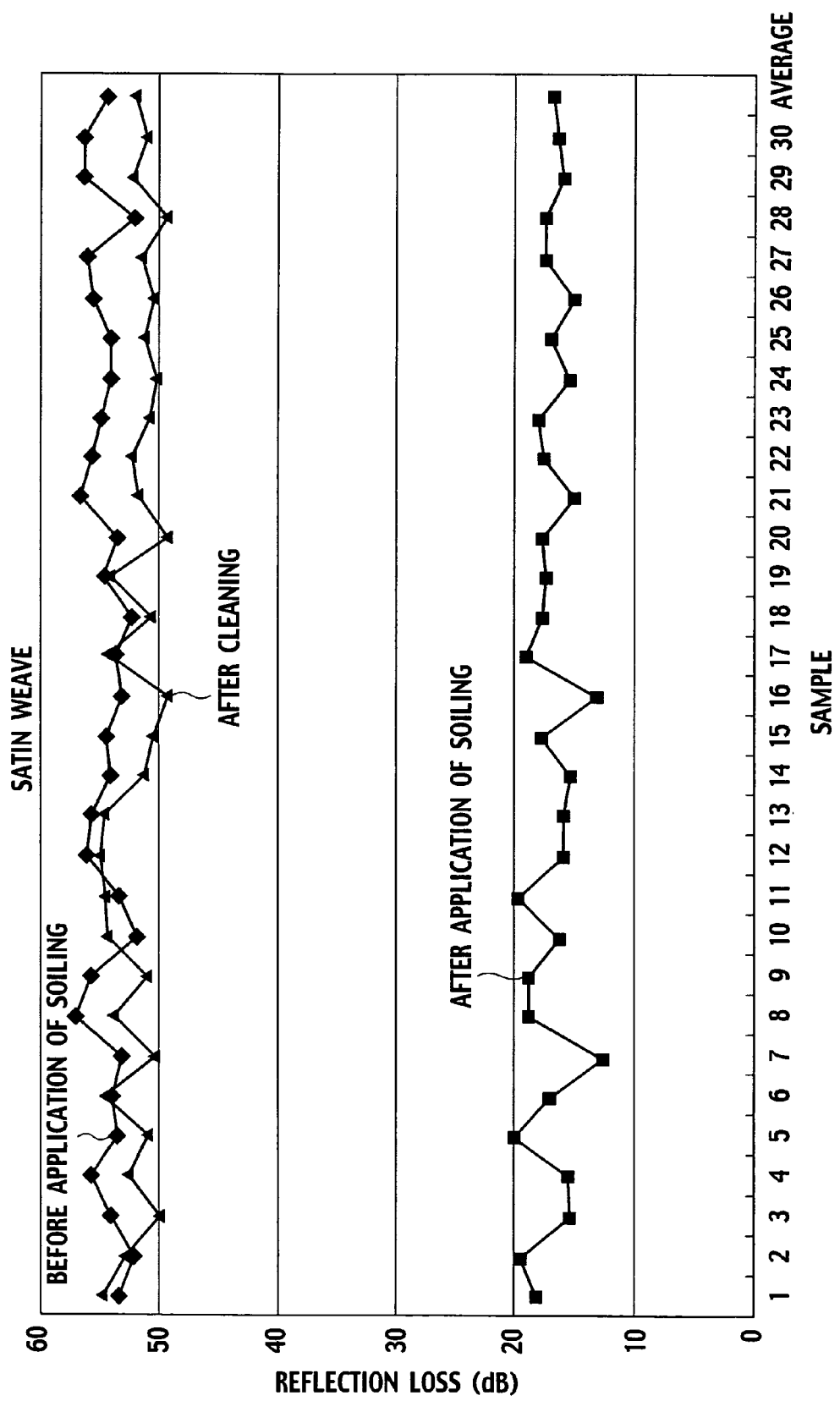
FIG. 8 shows the results of a cleaning experiment performed on a male type connecting end face using satin woven fabric cleaning tape.

FIG. 6 shows the results of 30 measurements obtained when using plain woven cleaning tape woven of warp threads and woof threads that were both of fibers of a diameter of 2 μm. FIGS. 7 and 8 show respectively, the results of 30 measurements when using cleaning tape employing twill woven and satin woven fabric in which the woof threads protrude to a greater extent on the surface of the cleaning tape than the warp threads, the warp threads being of fibers of a diameter of 15 μm and the woof threads being of fibers of a diameter of 2 μm.

As shown in FIGS. 6, 7 and 8, the average values of reflection loss obtained for the 30 measurements performed after cleaning were 47 dB when using plain woven cleaning tape and 52 dB when using satin woven or twill woven cleaning tape. Accordingly, superior cleaning effects were obtained from the satin woven or twill woven cleaning tape in contrast to the plain woven cleaning tape. Further, soiling was removed by the satin woven and twill woven fabric tapes to create a substantially clean condition in which the average reflection loss was close to the average reflection loss of 55 dB obtained for the 30 measurements conducted prior to application of soiling.

Figure 9:
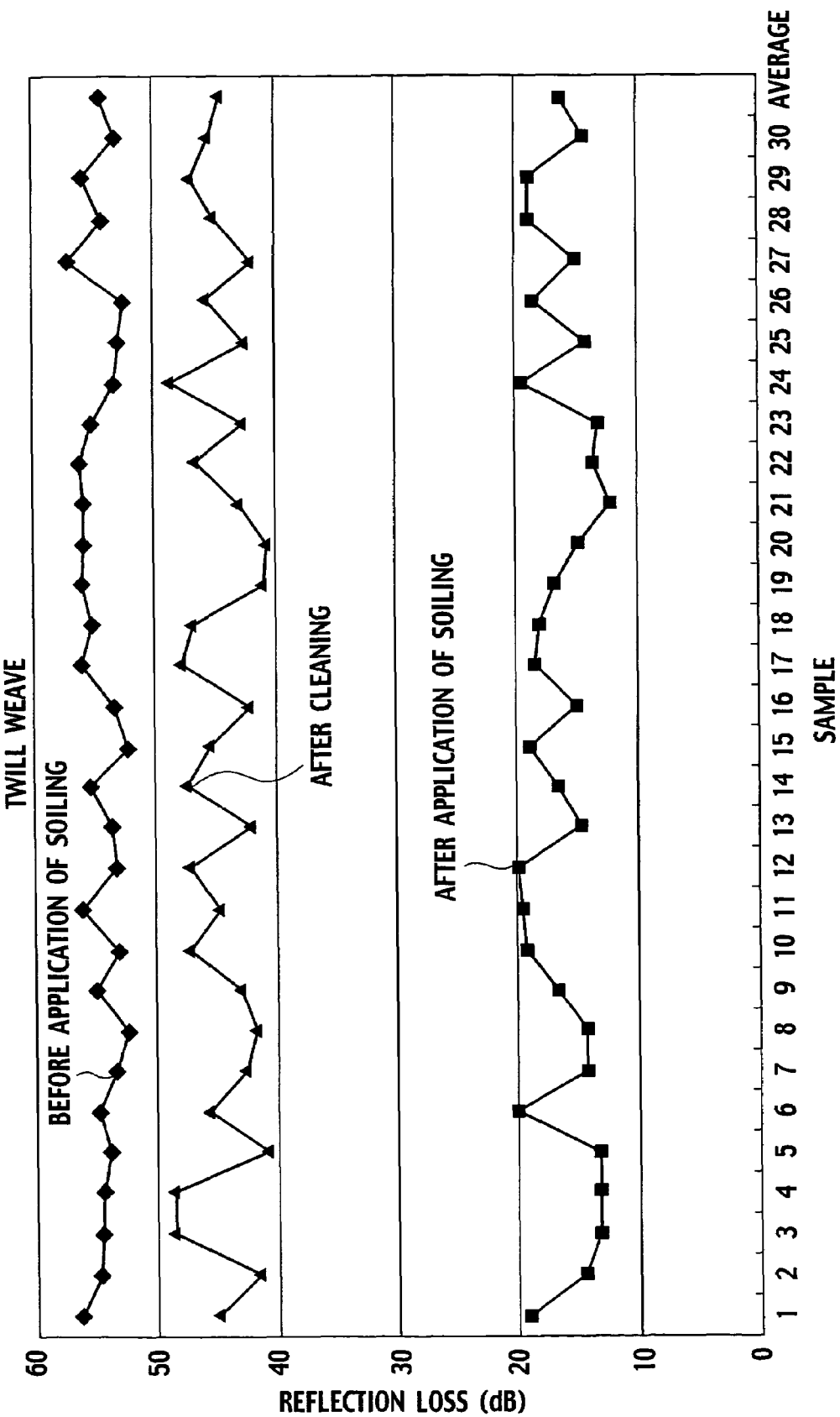
FIG. 9 shows the results of a cleaning experiment performed on a male type connecting end face using twill woven fabric cleaning tape and moving the connecting end face along the direction of the woof threads of the cleaning tape.
Figure 10:
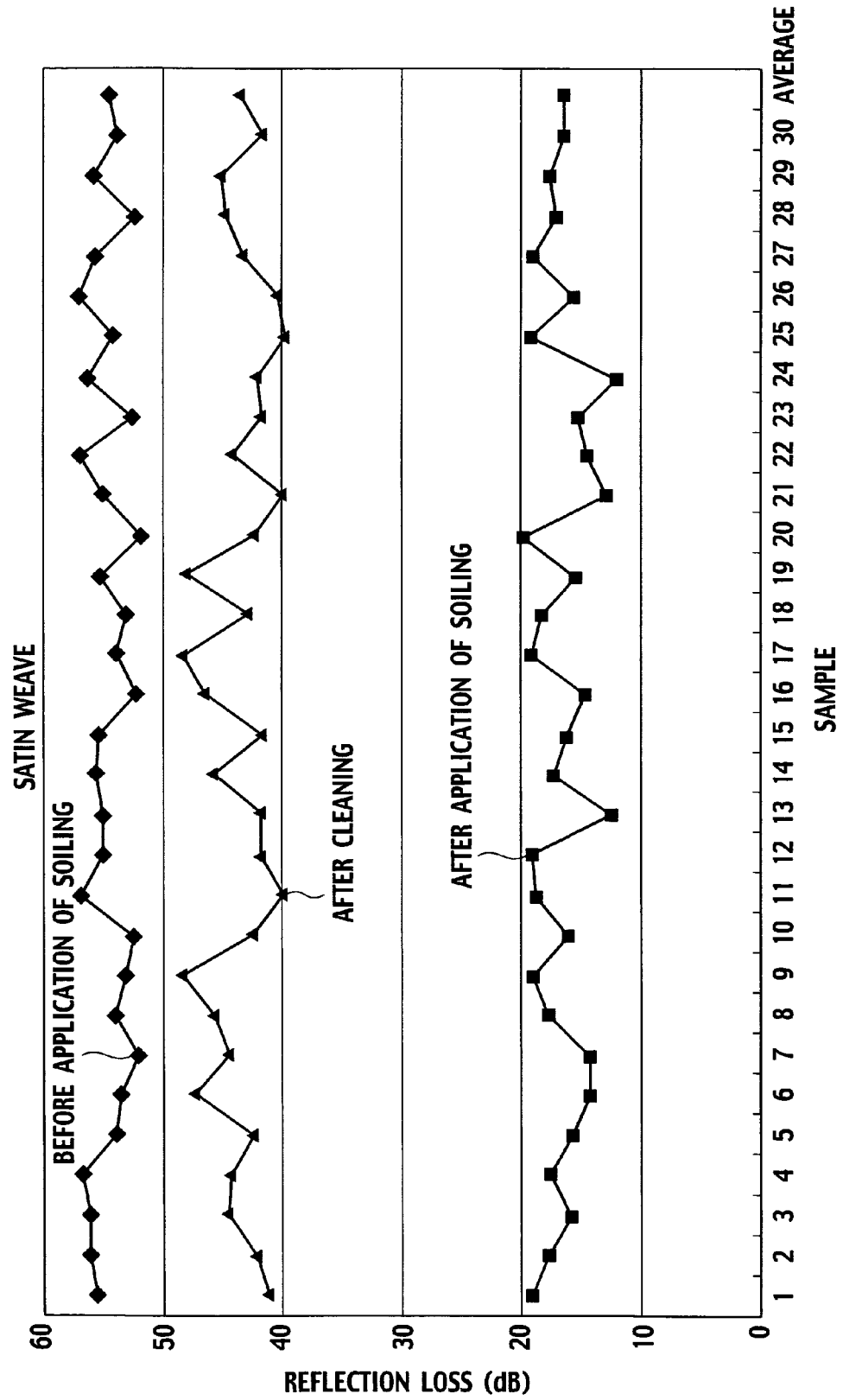
FIG. 10 shows the results of a cleaning experiment performed on a male type connecting end face using satin woven fabric cleaning tape and moving the connecting end face along the direction of the woof threads of the cleaning tape.

FIGS. 9 and 10 show respectively the results obtained using twill woven and satin woven fabric tapes, both cleaning the connecting end face 9a by relative displacement of 50 mm of the connecting end face in the lengthwise direction of the woof threads 7 of the respective tapes. As shown in FIGS. 9 and 10, the average values for reflection loss after cleaning were 45 dB in both cases, indicating that cleaning effectiveness was obtained only at about the same level of as that of the plain woven fabric 3 shown in FIG. 6.

EXAMPLE 2

An assessment of the cleaning properties of the cleaning tapes 3 was also conducted for a female type connector. More specifically, in the same manner as for Example 1, reflection loss of the connecting end face 9a was measured 30 times before soiling was applied to the connecting end face 9a, after soiling was applied to the connecting end face 9a and after cleaning the connecting end face 9a with the cleaning tape 3. Soiling was applied according to Bellcore (previously Bell Labs) standard GR-2923-CORE 5.1.4 to the connecting end face 9a.

Figure 15:
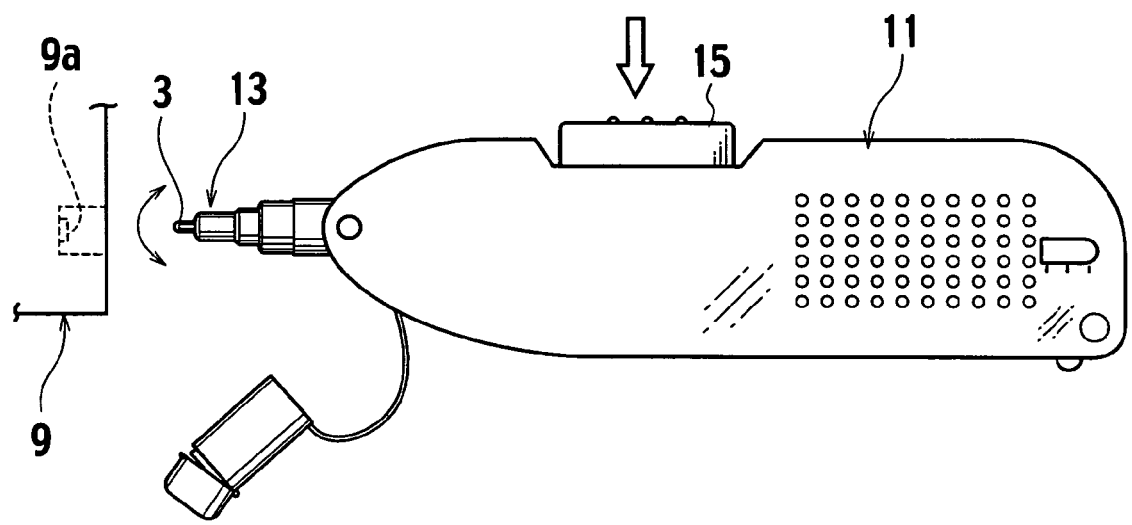
FIG. 15 is a schematic view showing the cleaning of a female type connecting end face using a cleaning fabric.

For cleaning the connecting end face 9a of the female connector 9, a cleaner 11 having an operating part 15 shown in FIG. 15 and disclosed in Japanese Unpublished Patent Application No. 2003-293006 (International Application No. PCT/JP2004/009830) was used. In the same manner as Example 1, plain woven, twill woven or satin woven fabric tape 3 was used, this being disposed in the cleaner 11 such that the respective fabrics were exposed from the tip of the cleaning part 13. This cleaning part 13 was inserted in the connector 9 and the cleaning end face 9a was cleaned by rotating the cleaning tape 10 mm while making contact with the connecting face 9a.

Figure 11:
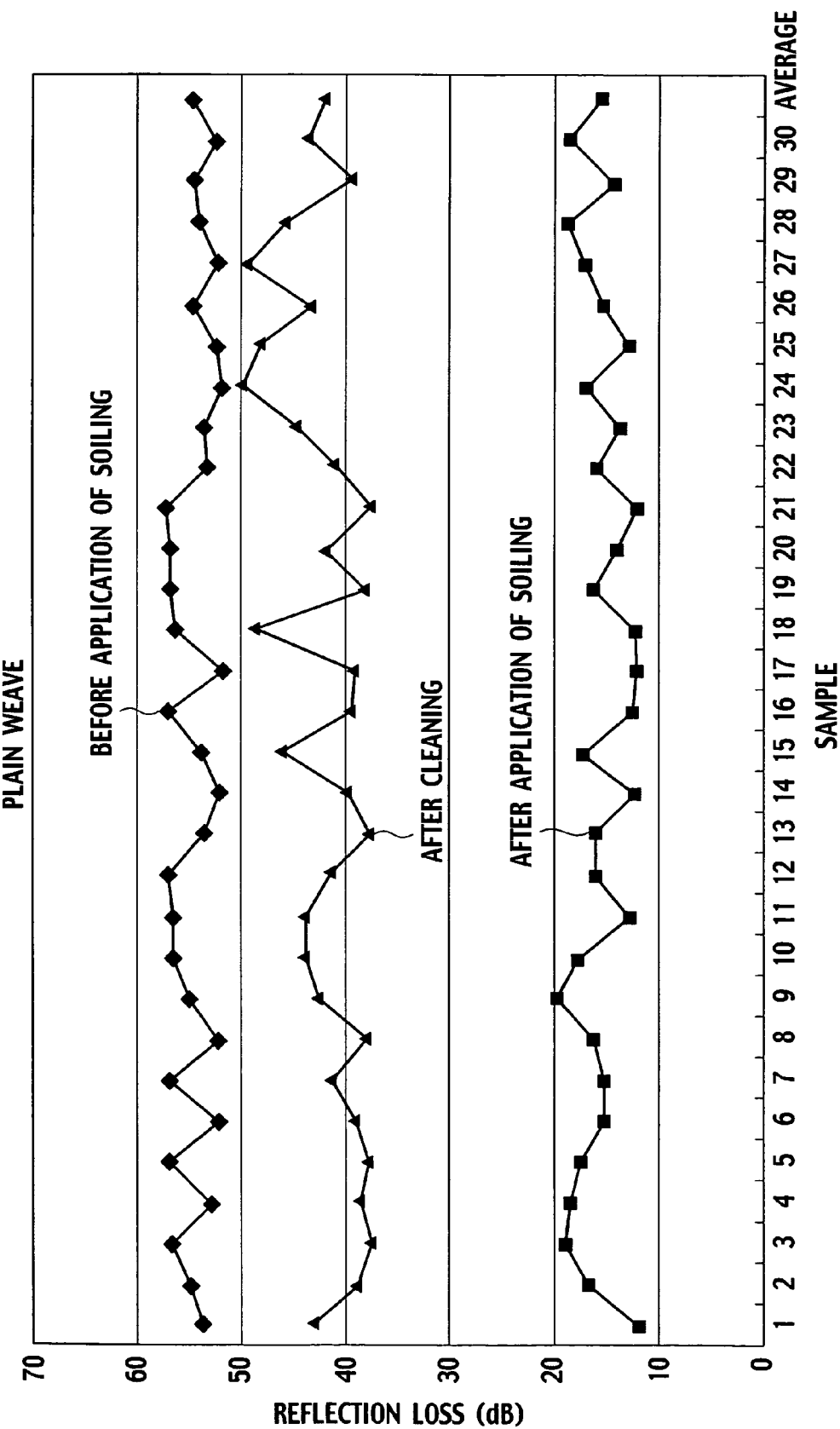
FIG. 11 shows the results of a cleaning experiment performed on a female type connecting end face using plain woven fabric cleaning tape fitted into a cleaning device.
Figure 12:
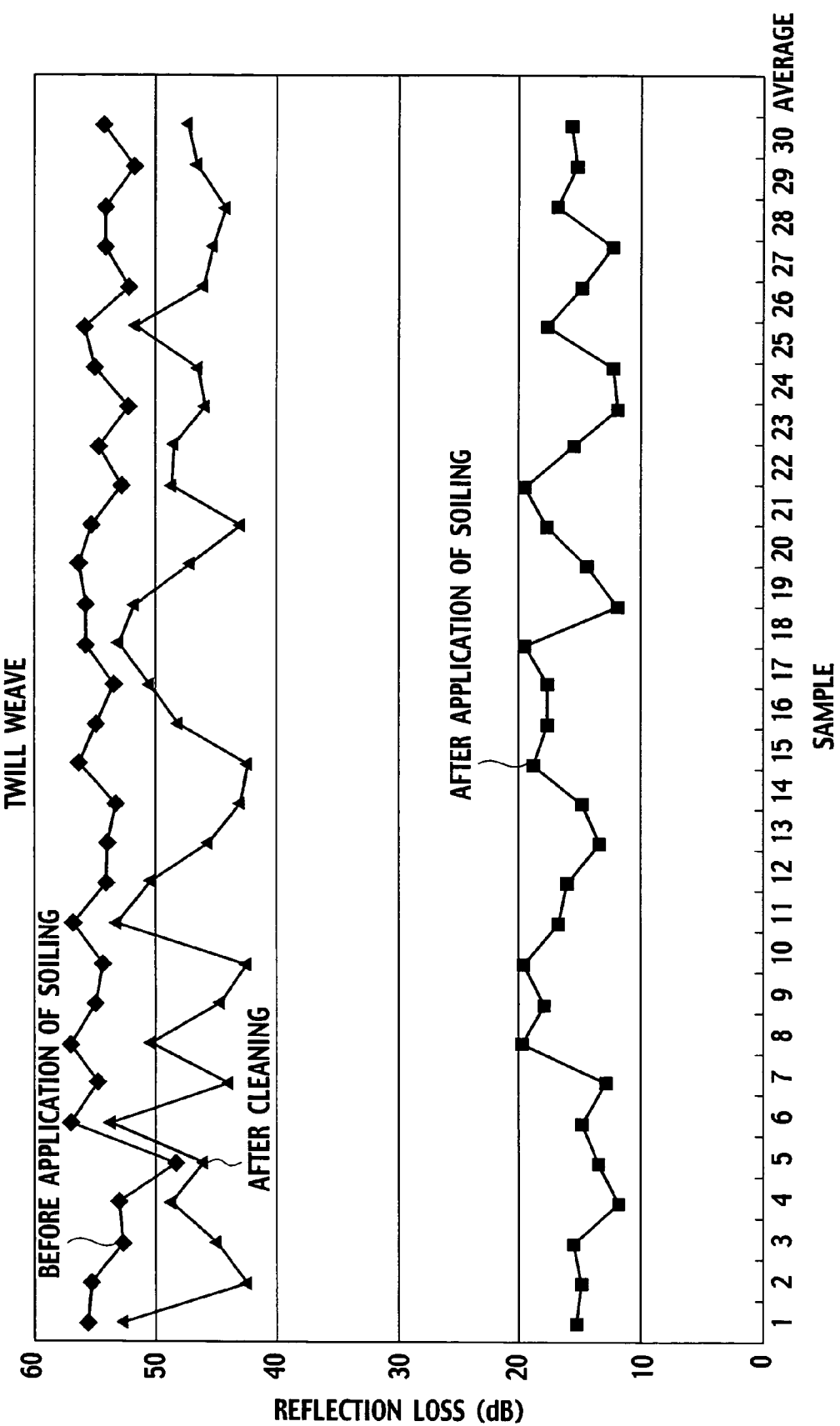
FIG. 12 shows the results of a cleaning experiment performed on a female type connecting end face using twill woven fabric cleaning tape fitted into a cleaning device.
Figure 13:
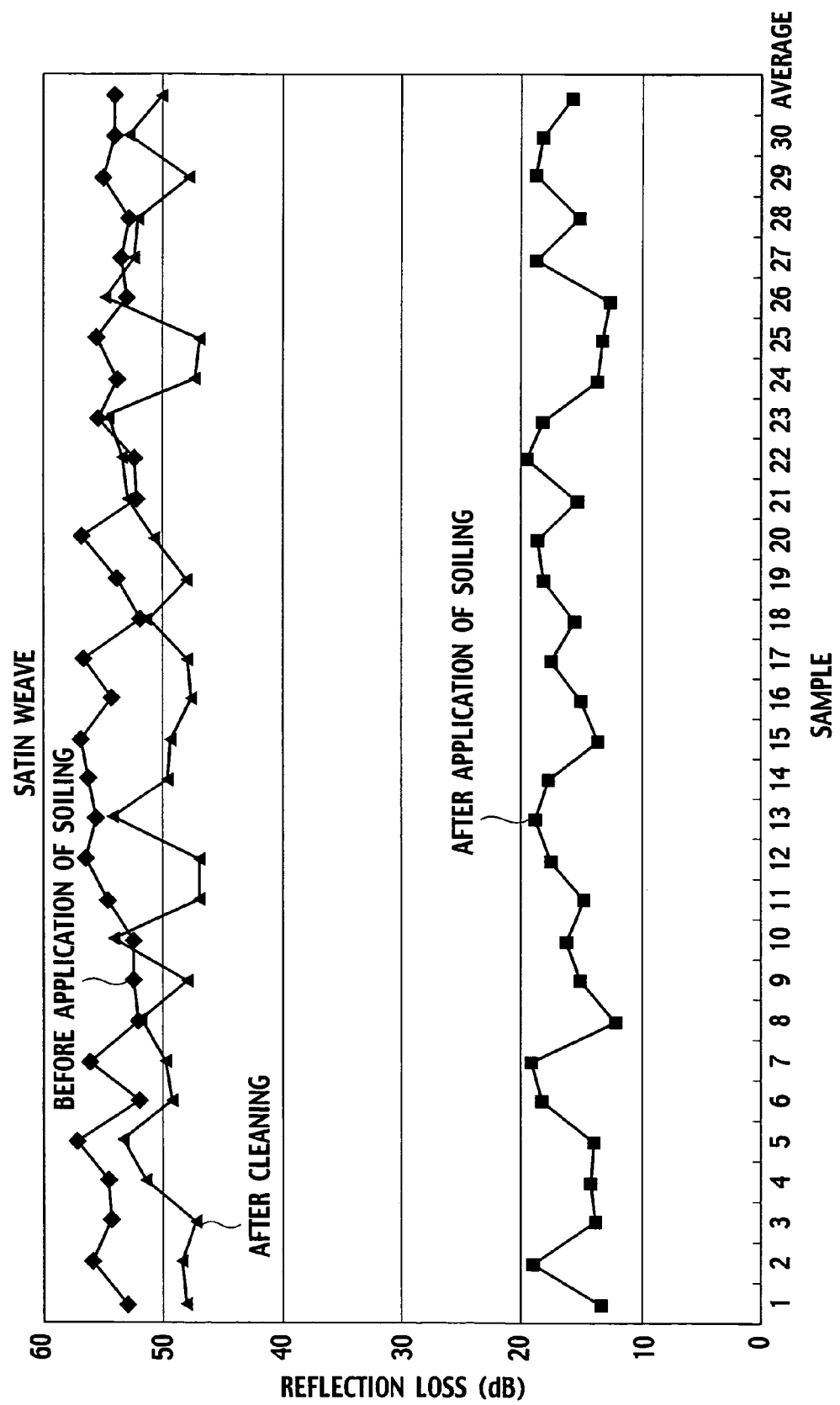
FIG. 13 shows the results of a cleaning experiment performed on a female type connecting end face using satin woven fabric cleaning tape fitted into a cleaning device.

FIGS. 11 to 13 show the results measured When cleaning using the three types of cleaning tape 3, respectively, the plain woven, twill woven and satin woven fabric cleaning tapes. As shown in those figures, in the same manner as the results for the male type connectors, in comparison to the plain woven fabric tape that has no directionality, superior cleaning effects were obtained from the satin woven or twill woven cleaning tapes in which the woof threads protrude from the surface of the fabric to a greater extent than the warp threads.

Although the invention has been described above by reference to certain exemplary embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of cleaning a connecting end face for an optical connecting part comprising the steps of:
    providing a cleaning tool comprising a tape shaped cleaning fabric made of a woven fabric having warp threads comprised of a plurality of fibers and woof threads comprised of a plurality of fibers that are finer than the fibers of said warp threads, the woof threads protruding on a surface of the cleaning fabric to a greater extent than the warp threads, and the warp threads extending in a lengthwise direction of the cleaning fabric, wherein each of the fibers of said warp threads has a diameter of 15 μm or greater and each of fibers of said woof threads has a diameter of 2 μm or less;
    urging the connecting end face of the optical connecting part against the surface of the cleaning fabric; and
    moving the connecting end face and the cleaning fabric relative to each other in a direction transverse to the woof threads so that material attached to the connecting end face is removed.

2. The method according to claim 1, wherein the optical connecting part is a male type connector having an exposed connecting end face of a ferrule and the relative movement between the connecting end face and the cleaning fabric is linear.

3. The method according to claim 1, wherein the optical connecting part is a female type connector in which the connecting face to be cleaned is enclosed in an adapter, and the relative movement between the connecting end face and the cleaning fabric is rotational.

* * * * *